(12) United States Patent
Morselli

(10) Patent No.: US 9,865,108 B2
(45) Date of Patent: Jan. 9, 2018

(54) VEHICLE SECURITY SYSTEM

(71) Applicant: CNH Industrial America LLC, New Holland, PA (US)

(72) Inventor: Riccardo Morselli, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/725,597

(22) Filed: May 29, 2015

(65) Prior Publication Data

US 2015/0348346 A1    Dec. 3, 2015

(51) Int. Cl.

| | |
|---|---|
| *G07C 9/00* | (2006.01) |
| *H04L 29/06* | (2006.01) |
| *B60R 25/045* | (2013.01) |
| *G07C 5/00* | (2006.01) |
| *H04L 9/32* | (2006.01) |
| *B60R 25/30* | (2013.01) |
| *H04L 9/08* | (2006.01) |

(52) U.S. Cl.
CPC ........ *G07C 9/00126* (2013.01); *B60R 25/045* (2013.01); *B60R 25/307* (2013.01); *G07C 5/008* (2013.01); *G07C 9/00166* (2013.01); *H04L 9/0822* (2013.01); *H04L 9/3226* (2013.01); *H04L 63/0428* (2013.01); *B60R 2325/108* (2013.01); *B60R 2325/20* (2013.01); *G07C 2009/00412* (2013.01); *H04L 2209/80* (2013.01); *H04L 2209/84* (2013.01)

(58) Field of Classification Search
CPC ..... B60R 25/042; B60R 25/23; B60R 25/101; B60R 25/045; B60R 25/307; B60R 2325/108; B60R 2325/20; G07C 9/00126; G07C 5/008; G07C 2009/00412; H04L 63/0428; H04L 9/0822; H04L 9/3226; H04L 2209/80; H04L 2209/84; G05C 9/00166

USPC ............. 340/10.4, 5.6, 426.36, 428; 180/287
See application file for complete search history.

(56) References Cited

U.S. PATENT DOCUMENTS

| | | | |
|---|---|---|---|
| 4,852,680 A | * | 8/1989 | Brown .................... B60R 25/23 180/287 |
| 5,917,405 A | * | 6/1999 | Joao ...................... B60R 25/018 307/10.2 |

(Continued)

FOREIGN PATENT DOCUMENTS

| | | |
|---|---|---|
| EP | 1067021 | 1/2001 |
| EP | 1959606 | 8/2008 |

(Continued)

OTHER PUBLICATIONS

European Search Report for Italian Application No. MO2014A000156 dated Feb. 23, 2015 (15 pages).

(Continued)

*Primary Examiner* — Ali Neyzari
(74) *Attorney, Agent, or Firm* — Rickard K. DeMille; Rebecca L. Henkel

(57) ABSTRACT

A vehicle security system comprising a first interface, an immobilizer electronic control unit and an immobilizing electronic control unit, each of which is connected to a CAN bus. The security functions are installed on the immobilizer electronic control unit which can be accessed by a user using a vehicle access code. The information is communicated over the CAN bus in an encrypted format.

10 Claims, 2 Drawing Sheets

(56) References Cited

U.S. PATENT DOCUMENTS

2004/0001593 A1  1/2004  Reinold et al.
2005/0073196 A1  4/2005  Kamiya
2008/0066186 A1  3/2008  Hammes

FOREIGN PATENT DOCUMENTS

EP    2716510       4/2014
WO    2004/068424   8/2004

OTHER PUBLICATIONS

Alfred J. Menezes et al., "Handbook of Applied Cryptography," Handbook of Applied Cryptography; CRC Press Series on Discrete Mathematices and its Applications, Jan 1, 1997, CRS Press, Boca Raton, FL, US, pp. 543-590.

* cited by examiner

VEHICLE SECURITY SYSTEM

CROSS REFERENCE TO RELATED APPLICATIONS

This application claims priority to Italian Application Serial No. MO2014A000156, entitled "A vehicle security system", filed May 29, 2014, which is incorporated by reference herein in its entirety for all purposes.

FIELD OF THE INVENTION

This invention relates to an improved vehicle security system, especially for use with agricultural vehicles.

BACKGROUND TO THE INVENTION

A problem with existing systems is that in some agricultural vehicles, especially tractors, each vehicle has a unique access key for locking and un-locking the cab doors. However, many similar vehicles then use the same mechanical ignition key to start the engine and permit operation of the tractor. This is done for convenience to enable employees on a farm to use a common key to operate any vehicle once its cab has been unlocked by the farmer.

One way to address this concern is to provide the key with a specific code to identify itself to the unit in order to allow access to the vehicle functions. Such keys need to be programmed to allow access and there is a concern that it may be possible for a third party to access identifying information from the CAN bus whilst programming. Additionally, it is desirable for an ECU of the vehicle to be interrogated, for example to retrieve maintenance and log information, without third parties being able to intercept the information being transferred.

SUMMARY OF THE INVENTION

Accordingly, the present invention is directed to a vehicle security system according to claim 1.

All of the basic units of the system, including the immobilizer unit, immobilizing unit and the display unit, are connected to the CAN bus and communicate therethrough. The vehicle can only be operated upon the correct vehicle access code (VAC) being entered into the first interface, which is then communicated to the immobilizer unit. This in turn permits the immobilizing unit to allow access to the security functions. Where an incorrect code is entered, the vehicle cannot be operated or can only be operated with limited functions.

In order the further protect the vehicle and prevent unauthorized access to the vehicle, the VAC is only sent over the CAN bus when it is in an encrypted format. Therefore, the risk of the code being intercepted and the security functions of the vehicle being accessed without authorization is reduced.

The VAC may be chosen by a user so that it is known to that user and those that are entrusted with the code by the user.

Advantageously, the VAC is used as the encryption key. This allows for the secure transmission of information that uses an encryption algorithm and the VAC code as the key.

Preferably, a secondary access code (SAC) is installed on the immobilizing electronic control unit, the immobilizer electronic control unit and the interface and the vehicle access code and/or other information is encrypted using the secondary access code as a key.

Whilst it may be desirable to install the SAC on only the first interface and the immobilizer unit in some embodiments, it is preferable that it is installed on all active components that are involved in allowing access to the security functions. Thus, SAC has two main functions, firstly to be used as an encryption key, and secondly, to prevent tampering strategies that might involve stealing the vehicle by replacing one or more units of the system—if the SAC does not match on all of the units, the information from the CAN bus cannot be decrypted and so the vehicle cannot be operated.

Advantageously, the secondary access code is a randomly generated code. The SAC may be numerical or may comprise letters, symbols and/or numbers and it may comprise a relatively large code. The SAC may be randomly generated at the end of line programming step or it may be supplied from a database of randomly generated SACS.

It is preferable that the secondary access code is unknown to any person. Where the SAC is not known to any person, the likelihood of the encryption key being compromised is low.

It is desirable that the SAC is generated and written into multiple modules that are connected to the CAN bus at the end of the line, during production. The number is therefore safely stored in the system and is not known by anybody, even the user. The SAC may be installed onto the system components in a pre-determined sequence or simultaneously to all components.

In an advantageous construction, a second interface device can be temporarily connected to the system and any data communicated to or from the second interface device is encrypted using the vehicle access code. Allowing a second interface device to be connected allows for a user to quickly access the system without needing to use the first interface. This is especially useful where a user is operating the vehicle and another person wants to access the ECU of the vehicle at the same time. The encryption may also involve the use of the SAC code.

Preferably, the second interface device is a handheld device that is connected to the system wirelessly. The use of a handheld device allows a user to access security functions and vehicle information by a remote telematics connection or an electronic service tool. This means that a manager can allow a particular key to access a vehicle. Therefore, a foreman may wish to provide a driver with access to a vehicle using the driver's key. The foreman can use the handheld device to authorise use of the vehicle using the driver's key without having to get into the vehicle. Additionally, or alternatively, the manager may change data stored on a particular key by using the vehicle to reprogram the key.

Advantageously, the method of wireless connection comprises short-wave radio transmissions, a personal area network, infra-red, a local area network or a mobile network. Bluetooth® communication or access over a 3G or 4G network may be desirable.

It is preferable that the data comprises maintenance information about the vehicle or activity log information. By allowing a user to access the information remotely, a check on the service records of multiple vehicles can be performed without the need to physically enter each vehicle provided the user has the necessary VACs.

In an advantageous embodiment, the vehicle access code can only be changed using the first interface device. This reduces the risk of a third party being able to tamper with the security codes remotely.

The use of the VAC and/or SAC to encrypt information to be sent over the CAN bus allows for the secure transmission of information around the system. Additionally, the owner of the vehicle can control operator rights on the vehicle and can manage the vehicle securely.

As soon as the VAC is entered on the display that is connected with the CAN bus of the tractor, more specifically a display that comprises the SAC, everyone can enter the immobilizer and add/remove/change its content by using the VAC again, on devices not comprising the SAC, without having to worry that someone can intercept the VAC during the transfer.

According to a second aspect of the invention, in some situations the first interface and the one or more electronic control units may be concentrated in a single electronic control unit. Communication from a second, whether or not wireless, interface device to this single electronic control unit may be performed in a secure way using the VAC.

According to a third aspect of the invention, a method is provided.

BRIEF DESCRIPTION OF THE DRAWINGS

An embodiment of the invention will now be described, by way of example only, and with reference to the accompanying drawings, in which.

DETAILED DESCRIPTION OF EXEMPLARY EMBODIMENTS

Figure 1:
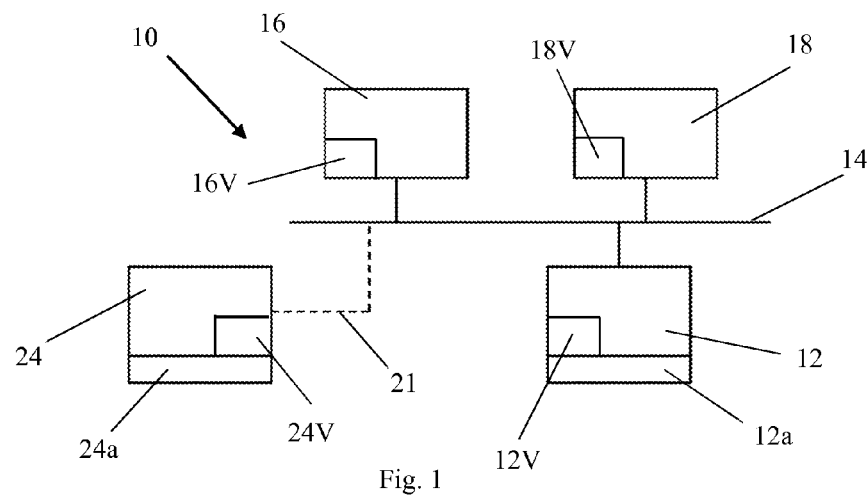
FIG. 1 is a diagram showing a security system in accordance with a first embodiment of the present invention.

FIG. 1 shows a security system 10 comprising a first user interface 12 in the form of a human-machine interface, for instance comprising a keyboard or an integrated touch screen display 12a. The first user interface 12 is non-portable and is installed into the cab of a tractor. The first user interface 12 is connected to a CAN bus 14 or any other communication link or channel of the tractor using hard-wiring. The CAN bus 14 is hard-wire connected to one or more vehicle electronic control units, e.g. an immobilizer unit 16, which reads the key used on the vehicle and identifies its validity, and an immobilizing unit 18, which prevents the vehicle from operating where the key is not valid. A second user interface device 24, which comprises a touch screen interface 24a, may be removably connected to the CAN bus 14 wirelessly (dashed line 21) so that it also can interact with the system 10. A handheld device may also be used.

During a first operation of the vehicle, whether at the production plant or at a dealer, the system 10 is provided with a vehicle access code (VAC). This code is programmed by the vehicle owner using the first user interface 12, installed in the first user interface 12 as 12V, and then copied and installed onto all relevant vehicle control units, e.g. the immobilizer unit 16 as 16V and the immobilizing unit 18 as 18V, using the CAN bus. The VAC is a code or number chosen by the owner of the vehicle so that they can gain access to the vehicle and its security information.

During this first operation the VAC is communicated over the CAN bus in a non-encrypted way and therefore it should be performed at a location where it is impossible for 3rd parties to track communication on the CAN bus. As the VAC is only known to the vehicle owner all future communications over the CAN bus can be made in a secure way. The VAC may be used in the encryption algorithm for encrypting the information passed over a communication link, e.g. a CAN bus, for instance in order to gain access to the security information or the vehicle.

If the vehicle owner wants to change the VAC he can copy this new VAC over the CAN bus in a secure way because the current VAC is used in the encryption algorithm.

Figure 5:
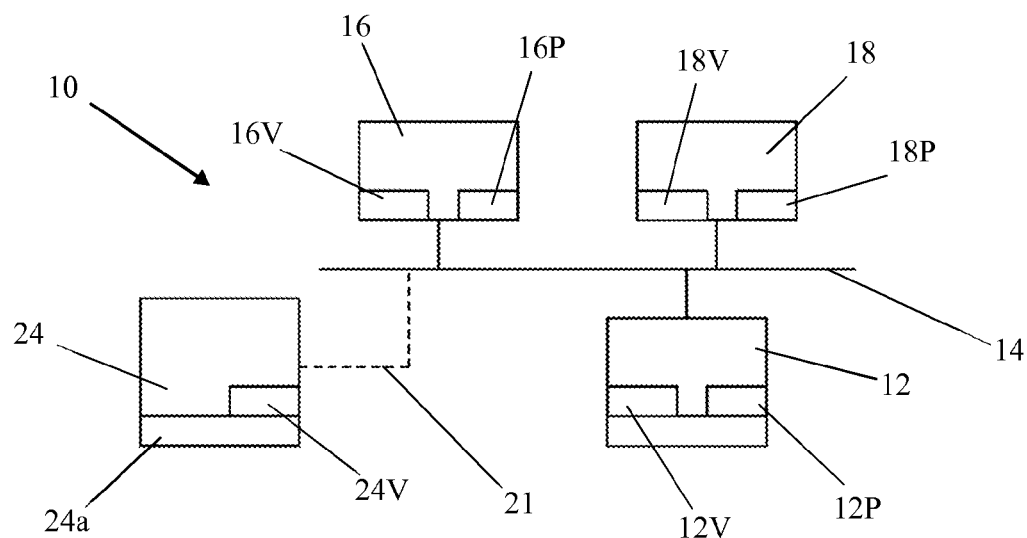
FIG. 5 is a diagram showing the security system of FIG. 4 during remote interrogation by a user.

A second user interface device 24, shown in FIGS. 1 and 5, may be connected to the CAN bus 14 either by a wired connection, or more preferably, by a wireless connection 21. The second user interface device 24, preferably a portable or handheld device, comprises a HMI, preferably a touch screen 24a to allow a user to interact with the vehicle electronic control units of the security system 10. The user enters the VAC into the device 24 (as 24V), and where the user has entered the correct VAC 24V, the user is permitted to access the security functions of the vehicle and or the information logs and/or to communicate information over the CAN bus in a secure way. Communication with over the CAN bus is encrypted using the VAC in the encryption algorithm, as the encryption key. By using an encrypted communication based upon the VAC, the other units in the system 10, which have the VAC installed, can recognise the device 24 as a secure device and therefore they can allow access to the security functions.

It is possible that HMI 12a of said first interface 12 is part of a single electronic control unit 12 connected to the CAN bus containing the VAC. This still allows the user to communicate in a secure, encrypted way over the CAN bus 14 with this single electronic control unit 12 using the second interface 24 and the VAC.

Figure 2:
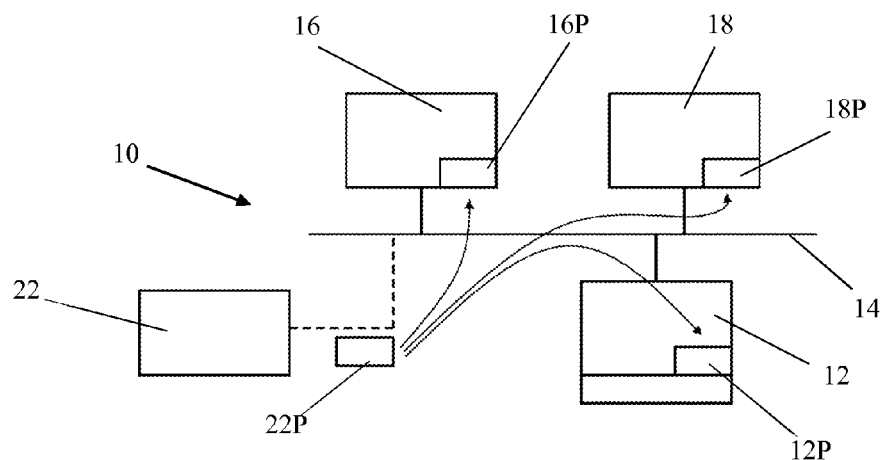
FIG. 2 is a diagram showing the security system of FIG. 1 at a set-up stage.

To avoid the risk that a person illicitly gains access to the VAC a further level of security can be added. FIG. 2 shows the security device 10 at the end of the installation process. An end of line programming tool 22 is wired or wirelessly connected to the CAN bus 14 and it installs a secondary access code (SAC) on the first user interface 12 and all relevant vehicle electronic control units, e.g. the immobilizer unit 16 and the immobilizing unit 18. The SAC is communicated in an unencrypted format to the units 12, 16 and 18 and is installed thereupon, as shown in the figures as 12P, 16P and 18P. The SAC 22P is not known to anyone. The SAC 22P may be sent to the first interface 12 and then copied to the other units 16 and 18 in the system in sequence or simultaneously, or it may be sent to each unit individually, either in sequence or in parallel. The SAC 22P is thus installed on the component units of the system 10. The SAC 22P is transmitted to the units without encryption (indicated by the solid curved lines) because it takes place at a secure location. This randomly generated SAC is installed before a VAC is installed in the system 10.

Figure 3:
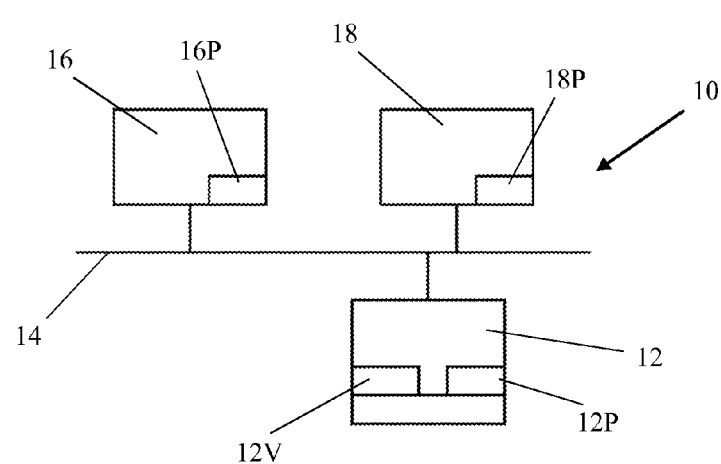
FIG. 3 is a diagram showing the security system of FIG. 1 in use.

In FIG. 3, the system 10 is provided with a VAC, which is programmed by the vehicle owner using the first user interface 12 (as 12V), and it is then copied onto the immobilizer unit 16 and the immobilizing unit 18. The VAC is a code or number chosen by the owner of the vehicle so that they can gain access to the vehicle and its security information. During the copying process, the information is encoded using an encryption algorithm with the SAC as the encryption key.

Figure 4:
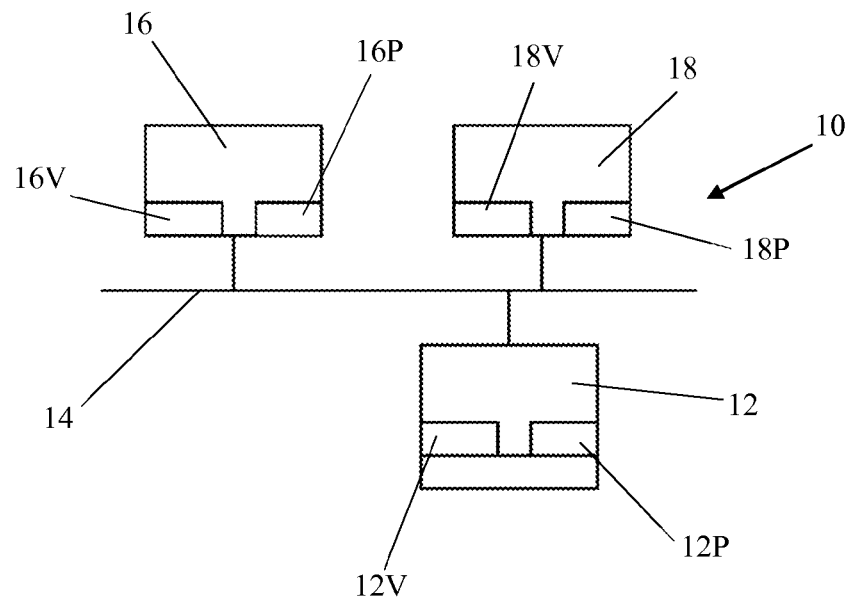
FIG. 4 is a further diagram showing the security system of FIG. 1 in use.

As shown in FIGS. 3 and 4, when the immobilizer 16 is to be activated for the first time, the user is requested to enter the vehicle access code VAC into the first interface 12 and is installed as 12V. The VAC 12V is then encrypted using an encryption algorithm with the SAC 12P as the encryption key. The VAC 12V is then communicated over the CAN bus 14 to the immobilizer unit 16 and the immobilizing unit 18. The immobilizer unit 16 and the immobilizing unit 18 have the SAC installed in their memory 16P and 18P and so they are able to unencrypt the received VAC information from the first interface 12, and they can process that information into 16V and 18V. Communication between the vehicle electronic control units 16, 18 and the first user interface 12 is always encrypted prior to being transmitted over the CAN bus 14; it is never exchanged in a readable, unencrypted format. The system 10 can be accessed and interrogated and/or changed via the first interface 12. The SAC is at least used to install the VAC for the first time on the first user interface 12 and any relevant vehicle electronic control unit in a secure, encrypted way.

Again a second user interface device 24, shown in FIG. 5 may be connected to the CAN bus 14. Because the device 24 was not part of the security system 10 at the time of installation and set-up, it is not provided with the SAC. Communication between the other units of the system 10 may still be encrypted using the SAC, but the communication of information with the second interface is encrypted using the VAC.

It will be appreciated that the first interface may be used in combination with encoded key that contains the VAC. Furthermore, the key may be programmed by the user with a particular code and further keys may also be programmed in that manner. With such a system, the user does not need to enter a code to access the security functions because the code is installed on the encoded key and read automatically.

The use of the SAC allows for different VACs to be used by different users and for the VACs to be passed along the CAN bus in an encrypted format. For example, one user may be allowed full access using a VAC and a second user allowed limited access using a second VAC. However, both VACs are encrypted using the SAC as the encryption key for transmission over the CAN bus such that neither VAC is communicated over the CAN bus without encryption.

Clearly, the SAC may be installed on other units and modules of the security system and it may be desirable for a portable interface device to be loaded with the SAC. Such a device may be provided with the SAC during manufacture and set-up of the whole system.

Where a portable device is connected to the CAN bus, upon inputting of the correct VAC, the system may 'teach' the portable device the SAC with a time-to-live (TTL), such that the portable device can be used for a period as if it was a permanent part of the system and so all transmissions over the CAN bus use the SAC as the encryption code after the initial use of the VAC to authorise the portable device. However, the SAC on the portable device has a time-to-live and so after the device is disconnected from the system the SAC is 'forgotten' or automatically removed from the device. Further connection of the portable device to the system will require use of the VAC to initiate communication again before the SAC is again taught to the portable device with a TTL.

Where communication with the system is initiated using the portable device, limited information may be exchanged with the device, for example log records and maintenance information, but full access may be restricted when accessing the system from the portable device. As an example, the ability to change the VAC code may only be possible using the first, non-portable, interface so that the VAC cannot be changed using the second, portable interface.

The second interface may be a smartphone, a tablet, a computer or other user interface.

The CAN bus may be a wireless CAN bus operating using short-wave radio signals and/or a local area network. In such a situation, it is important to use the encryption method of the present invention to prevent theft of information over the wireless network.

Information stored on the individual modules of the system may or may not be stored in an encrypted format using the SAC and/or the VAC as the encryption key. Regardless of their encryption state when stored, during transmission over the CAN bus, they will be encrypted.

The invention claimed is:

1. A vehicle security system comprising a first user interface, one or more electronic control units, connected through a communication channel, wherein vehicle functions related to said one or more electronic control units are accessible by using a first vehicle access code (VAC) or a second vehicle access code (VAC), wherein the first VAC defines a first level of access to the vehicle functions to which a user is allowed and the second VAC defines a second level of access to the vehicle functions to which a user is allowed, and wherein some or all information or data is communicated over said communication channel in an encrypted format, and
wherein a secondary access code (SAC) is installed on said one or more control units and said first user interface, and said SAC is used to encrypt both the first and second VACs for at least the first time when installed on said one or more control units over said communication channel.

2. A system according to claim 1, wherein the first and second VACs are used in the encryption algorithm for encrypting the information communicated over the communication channel.

3. A system according to claim 1, wherein a second user interface can be temporarily connected to the system and some or all data communicated to or from the second user interface is encrypted using the first or second vehicle access code (VAC).

4. A system according to claim 3, wherein the second user interface device is a device that is connected to the system wirelessly.

5. A system according to claim 4, wherein the method of wireless connection comprises short-wave radio transmissions, a personal area network, infra-red, a local area network, or a mobile network.

6. A system according to claim 1, wherein the data comprises maintenance, security or activity information.

7. A system according to claim 1, wherein said first user interface is part of said one or more control units.

8. A system according to claim 1, wherein said SAC is a randomly generated code.

9. A method for secure transfer of information on a vehicle security system, the system comprising a first user interface, one or more electronic control units connected through a communication channel, wherein the method comprises the steps of:
storing a first vehicle access code (VAC) and a second VAC in said first user interface, wherein the first VAC defines a first level of access to vehicle functions of said one or more electronic control units to which a user is allowed and the second VAC defines a second level of access to vehicle functions of said one or more electronic control units to which a user is allowed;

storing said first and second VACs in said one or more electronic control units through said communication channel;

communicating some or all information or data related to the vehicle functions of said one or more electronic control units over said communication channel to and from said electronic control units and said first user interface in an encrypted format;

installing a secondary access code (SAC) on said one or more control units and said first user interface; and using said SAC to encrypt said first and second VACs when entered in said first user interface for at least the first time and to install said first and second VACs on said one or more electronic control units over said communication channel.

10. A method according to claim 9, said method further comprising the steps of:

Connecting a further, second user interface temporarily to said communication channel;

Communicating some or all information or data to or from said second user interface in an encrypted format using said first and second VACs.

* * * * *